US006944530B2

(12) United States Patent
Russell et al.

(10) Patent No.: US 6,944,530 B2
(45) Date of Patent: Sep. 13, 2005

(54) SYSTEM AND METHOD FOR AIR FLOW AND EGR FLOW ESTIMATION

(75) Inventors: John D. Russell, Farmington Hills, MI (US); Allan Joseph Kotwicki, Williamsburg, MI (US); Freeman Carter Gates, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 10/625,758

(22) Filed: Jul. 22, 2003

(65) Prior Publication Data

US 2004/0065303 A1 Apr. 8, 2004

Related U.S. Application Data

(60) Division of application No. 09/539,227, filed on Mar. 30, 2000, now Pat. No. 6,609,058, which is a continuation-in-part of application No. 09/226,681, filed on Jan. 11, 1999, now Pat. No. 6,308,694, and a continuation-in-part of application No. 09/517,201, filed on Mar. 2, 2000, now Pat. No. 6,321,732, which is a continuation-in-part of application No. 09/226,681, filed on Jan. 11, 1999, now Pat. No. 6,308,694, and a continuation-in-part of application No. 09/090,125, filed on Jun. 4, 1998, now Pat. No. 6,138,504.

(51) Int. Cl.$^7$ .............................. F02M 25/07; G01F 1/42
(52) U.S. Cl. .................. 701/104; 701/108; 123/568.11; 123/568.19; 73/117.3; 73/861.61
(58) Field of Search ................................. 701/104, 108; 123/568.11, 568.16, 568.19, 568.21, 568.27; 73/117.3, 118.2, 861.52, 861.61

(56) References Cited

U.S. PATENT DOCUMENTS

| 4,290,404 A | 9/1981 | Hata et al. ............... 123/478 |
| 4,390,001 A | 6/1983 | Fugimoto ............... 123/568.2 |
| 4,406,161 A | 9/1983 | Locke et al. ............. 73/118.1 |
| 4,555,952 A | 12/1985 | Jenkins ................... 73/861.47 |
| 4,562,744 A | 1/1986 | Hall et al. ................ 73/861.02 |
| 4,690,120 A | 9/1987 | Egle ....................... 123/568.16 |
| 5,086,655 A | 2/1992 | Fredericks et al. ....... 73/861.61 |
| 5,188,086 A | 2/1993 | Adkins et al. .......... 123/568.27 |
| 5,190,017 A | 3/1993 | Cullen et al. ............ 123/670 |
| 5,203,313 A | 4/1993 | Rotarius ................ 123/568.27 |
| 5,205,260 A | 4/1993 | Takahashi et al. ........ 123/494 |
| 5,273,019 A | 12/1993 | Matthews et al. ....... 123/406.48 |

(Continued)

FOREIGN PATENT DOCUMENTS

| GB | 2312284 | 10/1997 |
| JP | 10-53032 | 3/1998 |

OTHER PUBLICATIONS

"System Dynamics", Prentice Hall, ISBN 0-13 8803585-4, Ogata, pp. 250-255, 1978.

"Modeling and Validation of Automotive Engine for Control Algorithm Development"; J. Moskwa, J. Hedrick; pp. 237-247; Advanced Automotive Technologies—1989; DSC-vol. 13; Annual Meeting of The American Society of Mechanical Engineers, San Francisco, CA, Dec. 10-15, 1989.

*Primary Examiner*—Hieu T. Vo
(74) *Attorney, Agent, or Firm*—Allan J. Lippa (57) ABSTRACT

An exhaust gas recirculation system directs exhaust gasses from an exhaust manifold to an intake manifold of an internal combustion engine. The exhaust gasses travel from the exhaust manifold, first passing through a flow control valve and then through a measuring orifice before entering the intake manifold. Pressure upstream of the orifice is used, along with correction pressure downstream of the orifice, to measure and control exhaust gas flow. Further, manifold pressure is determined from downstream pressure and the used along with the measured exhaust gas flow to calculated a cylinder air charge amount.

34 Claims, 9 Drawing Sheets

U.S. PATENT DOCUMENTS

| | | | |
|---|---|---|---|
| 5,331,936 A | 7/1994 | Messih et al. | 123/480 |
| 5,347,843 A | 9/1994 | Orr et al. | 75/1.34 |
| 5,390,649 A | 2/1995 | Miener et al. | 123/676 |
| 5,461,932 A | 10/1995 | Hall et al. | 73/861.61 |
| 5,465,617 A | 11/1995 | Dudek et al. | 73/118.2 |
| 5,474,051 A | 12/1995 | Matsumoto et al. | 123/586.16 |
| 5,497,329 A | 3/1996 | Tang | 701/104 |
| 5,508,926 A | 4/1996 | Wade | 701/29 |
| 5,520,161 A | 5/1996 | Klopp | 123/676 |
| 5,537,977 A | 7/1996 | Hartman et al. | 123/406.46 |
| 5,546,795 A | 8/1996 | Yamagishi | 73/118.2 |
| 5,577,484 A | 11/1996 | Izutani et al. | 123/568.16 |
| 5,585,553 A | 12/1996 | Schricker | 73/117.3 |
| 5,613,479 A | 3/1997 | Gates et al. | 123/568.27 |
| 5,714,683 A | 2/1998 | Maloney | 73/118.2 |
| 5,753,805 A | 5/1998 | Maloney | 73/118.2 |
| 5,964,820 A | 10/1999 | Miwa et al. | 701/108 |
| 5,988,149 A | 11/1999 | Gates | 123/568.21 |
| 6,138,504 A | 10/2000 | Lewis et al. | 73/118.2 |
| 6,182,644 B1 | 2/2001 | Kotwicki et al. | 123/568.16 |
| 6,308,694 B1 | 10/2001 | Kotwicki et al. | 123/568.16 |
| 6,321,732 B1 * | 11/2001 | Kotwicki et al. | 123/568.16 |
| 6,609,058 B1 * | 8/2003 | Russell et al. | 701/104 |

* cited by examiner

SYSTEM AND METHOD FOR AIR FLOW AND EGR FLOW ESTIMATION

CROSS REFERENCE TO RELATED APPLICATIONS

This application is a divisional of Ser. No. 09/539,227 filed Mar. 30, 2000, now U.S. Pat. No. 6,609,058 which is a continuation-in-part of application Ser. No. 09/226,681, filed Jan. 11, 1999 now U.S. Pat. No. 6,308,694 and application Ser. No. 09/517,201, filed Mar. 2, 2000, now U.S. Pat. No. 6,321,732 which is, in turn, a continuation-in-part of Ser. No. 09/226,681, filed Jan. 11, 1999, now U.S. Pat. No. 6,308,694 and Ser. No. 09/090,125, filed Jun. 4, 1998 now U.S. Pat. No. 6,138,504. This application hereby expressly incorporates by reference the entire specification of Ser. No. 09/226,681, filed Jan. 11, 1999, Ser. No. 09/517,201 filed Mar. 2, 2000, and Ser. No. 09/090,125, filed Jun. 4, 1998.

FIELD OF THE INVENTION

The present invention relates to an air/fuel ratio control system for an internal combustion engine where air flow and exhaust gas recirculation flow are calculated from pressure sensors.

BACKGROUND OF THE INVENTION

Engine control systems often determine the amount of fuel to inject by measuring a manifold pressure, along with other engine operating conditions. This method is often referred to by those skilled in the art as the speed density method. In this method, a mean value model of engine operation is constructed, where an average manifold pressure at a given speed results in a certain air flow into the cylinder. In this type of system, measurement of the manifold pressure is critical for proper prediction of the air flow into the cylinder and thus for proper air/fuel ratio control.

As stated above, many methods are available to estimate cylinder air charge using a manifold pressure sensor. Typically, engine maps are provided that provide a cylinder air charge as a function of measured manifold pressure, manifold temperature, and engine speed. In engines that also utilize exhaust gas recirculation, an improved cylinder air charge estimate is obtained by providing adjustments based on the amount of exhaust gas recirculation.

One particular method is described in U.S. Pat. No. 5,205,260. In this method, an EGR flow is estimated based on differential pressure across a flow control valve and based on a cross-sectional area of the valve. Then, this flow is used in a manifold filling model to estimate a partial pressure of EGR in the intake manifold. Then, based on this partial pressure of EGR and measured manifold pressure, a cylinder air charge value is computed.

The inventors herein have recognized a disadvantage with the above system. In particular, estimating EGR flow in this manner leads to estimation inaccuracies, due to valve area uncertainty. This uncertainty may be caused by deposits in the valve. Since inaccuracies in EGR flow directly affect estimated cylinder air charge, this leads to inaccuracies in calculated fuel injection amount and therefore may degrade air-fuel ratio control.

Another approach to determining EGR amount has used a differential pressure measurement across an orifice to infer a flow of exhaust gas. Traditionally, the orifice is located upstream of the exhaust gas recirculation flow control valve. Thus, the pressure measurements are shielded from the intake manifold pressure pulsations; however, the pressure measurements are not shielded from the exhaust pressure pulsations. In the traditional system, the high frequency pressure pulsations present in the pressure measurements are reduced by using a conventional low pass filter. Such a system is disclosed in U.S. Pat. No. 5,613,479.

The inventors herein have recognized a significant opportunity to reduce total system cost by relocating the orifice downstream of the exhaust gas recirculation flow control valve but before the intake manifold. Thus, the manifold pressure sensor can be used to measure the pressure downstream of the orifice and a single absolute pressure sensor can be used to measure the pressure upstream of the orifice. This creates the needed differential pressure to measure exhaust gas recirculation flow, as well as an opportunity to estimate cylinder fresh charge.

SUMMARY OF THE INVENTION

An object of the invention claimed herein is to provide an exhaust gas recirculation measurement system and cylinder air charge estimation system with improve accuracy.

The above object is achieved, and problems of prior approaches overcome, by a system for estimating engine flows, including exhaust gas flow from an exhaust manifold of an internal combustion engine to an intake manifold of the engine, the system comprising: a flow control valve having a variable orifice positioned in an exhaust gas recirculation path between the exhaust manifold and intake manifold of the engine; a fixed orifice area located in said path and downstream of said valve; and a computer for measuring a first pressure between said fixed orifice area and said flow control valve, measuring a second pressure downstream of said fixed orifice area, calculating a recirculated exhaust flow based on said first pressure and said second pressure, and determining an air amount based on said second pressure and said calculated recirculated exhaust flow.

By using common signals for estimating EGR flow and cylinder air charge, a simplified structure and reduced cost system is obtained. Further, by using a fixed orifice area downstream of a control valve to recirculate exhaust gas along with pressure measurements upstream and downstream of the orifice, a more accurate EGR flow estimate is obtained. In particular, the estimation scheme does not have to account for the changing valve area, and thus less affects have to be included. Further yet, the present invention does not need to measure or infer exhaust manifold temperature or exhaust manifold pressure.

An advantage of the above aspect of the invention is that more accurate cylinder air charge estimate is obtained.

Another advantage of the above aspect of the invention is that the more accurate cylinder air estimate yields improved emissions at a reduced system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

Figure 1:
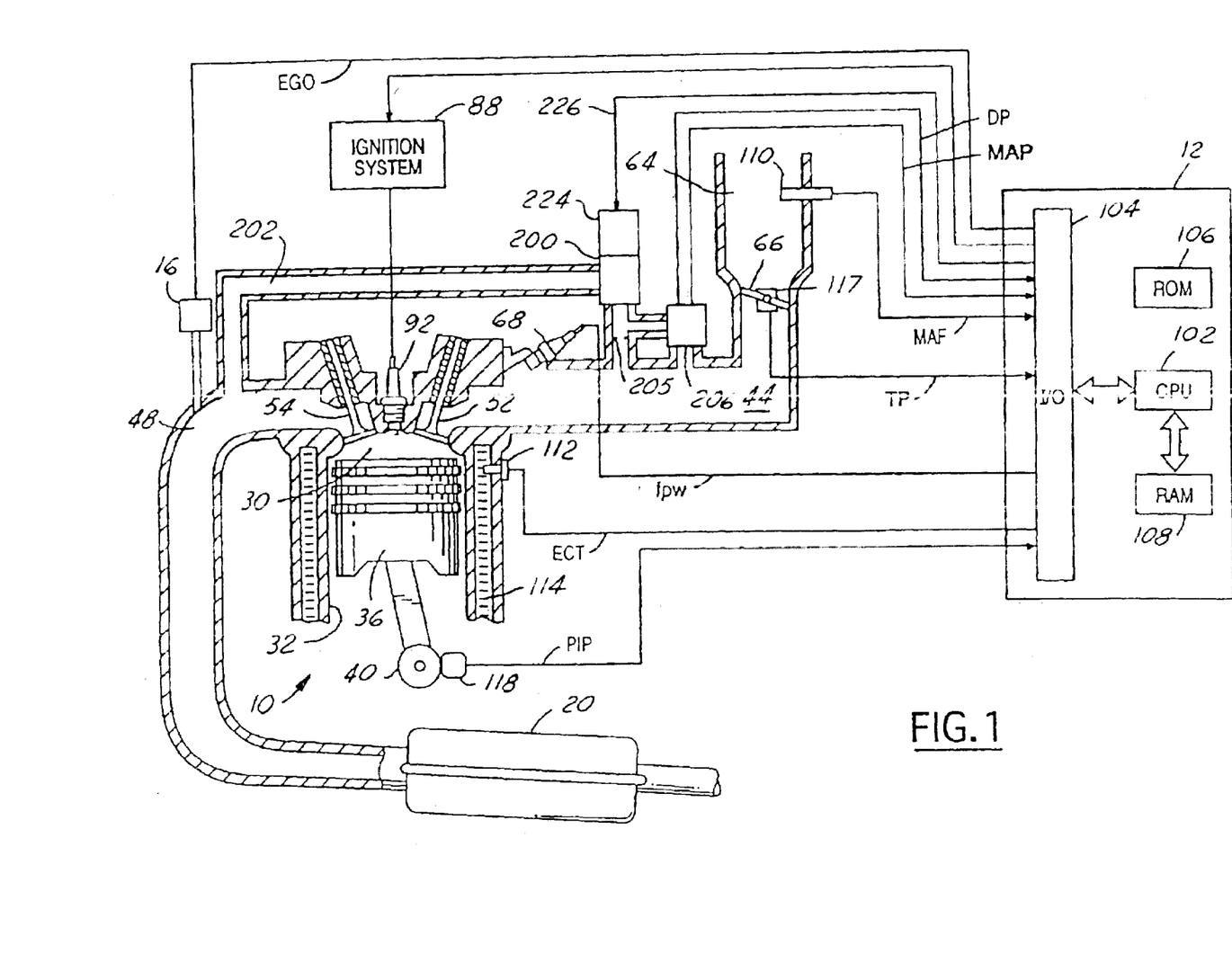
FIG. 1 is a block diagram of an engine in which the invention is used.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Exhaust gas is delivered to intake manifold 44 by a conventional EGR tube 202 communicating with exhaust manifold 48, EGR valve assembly 200, and EGR orifice 205. Alternatively, tube 202 could be a internally routed passage in the engine that communicates between exhaust manifold 48 and intake manifold 44. Flow Sensor 206 communicates with EGR tube 202 between valve assembly 200 and orifice 205. Flow sensor 206 also communicates with intake manifold 44. Stated another way, exhaust gas travels from exhaust manifold 44 first through valve assembly 200, then through EGR orifice 205, to intake manifold 44. EGR valve assembly 200 can then be said to be located upstream of orifice 205.

Flow sensor 206 provides a measurement of manifold pressure (MAP) and pressure drop across orifice 205 (DP) to controller 12. Signals MAP and DP are then used to calculated EGR flow as described later herein with particular reference to FIGS. 3–5. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, as is obvious to those skilled in the art, any type of flow control valve may be used, such as, for example, an electrical solenoid powered valve or a stepper motor powered valve.

Figure 2A:
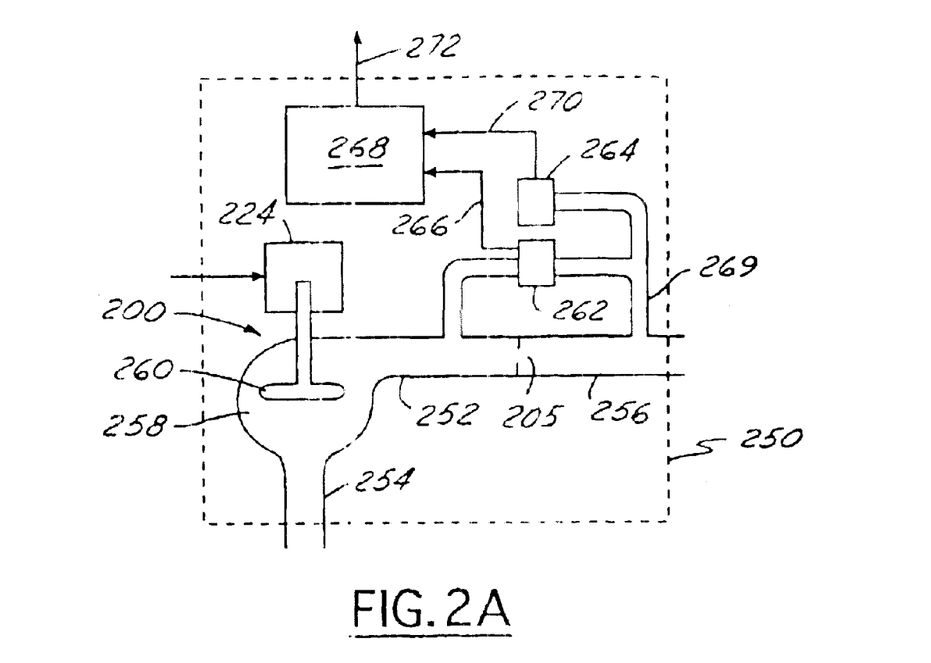
FIGS. 2A and 2B are alternate embodiments of the present invention.
Figure 2B:
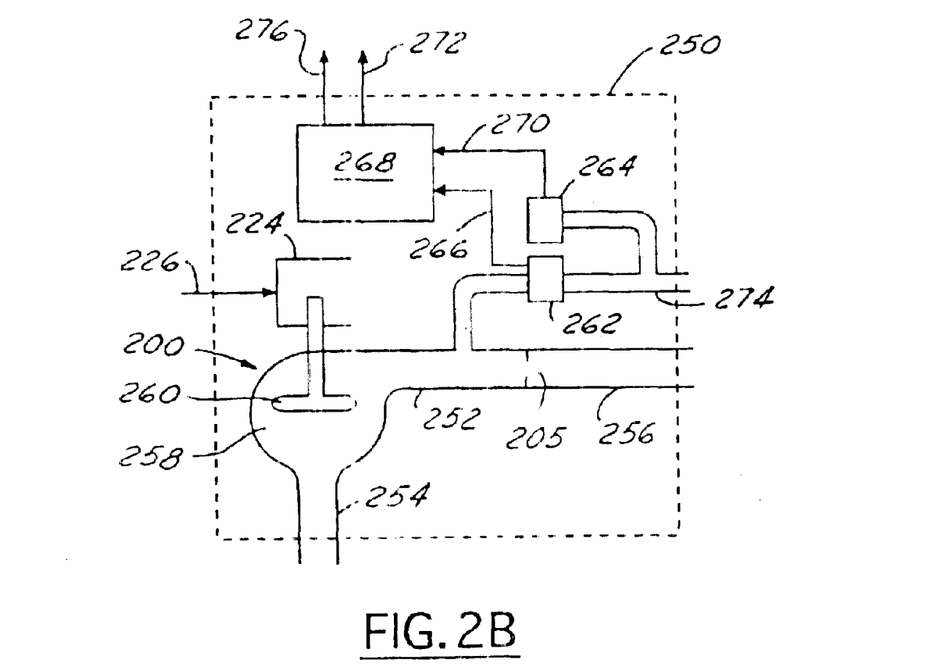

Referring now to FIGS. 2A and 2B, and in particular to FIG. 2A, an alternative embodiment of the present invention is shown in which housing 250 contains path 252 with inlet end 254 and outlet end 256. Variable orifice 258 is controlled by pintle 260 of valve 200. Housing 250 also holds vacuum regulator 224 which is coupled to valve 200 and thereby regulates pintle 260. Path 252 also has orifice 205 coupled to outlet end 256. Differential pressure sensor 262 measures pressure difference across orifice 205 and provides differential pressure signal 266 to circuit 268. Pressure sensor 264 measures communicates via measurement path 269 with outlet end 256 and measure pressure downstream of orifice 205 and provides pressure signal 270 to circuit 268. Circuit 268 calculates, either digitally using microprocessor circuits known to those skilled in the art or using analog circuits known to those skilled in the art, the product of signals 266 and 270. Circuit 268 then makes the result of this calculation available in signal 272.

Alternatively, as shown in FIG. 2B, differential sensor 262 and sensor 264 communicate with downstream flow (not shown) via second communication path 274. In this embodiment, paths 256 and 274 are adapted to be connected to an intake manifold of an internal combustion. Then, path 274 and 256 will be in fluid communication via the intake manifold. Such an arrangement is preferable if circuit 268 also provide signal 276 representing the pressure measured by sensor 264.

Figure 3:
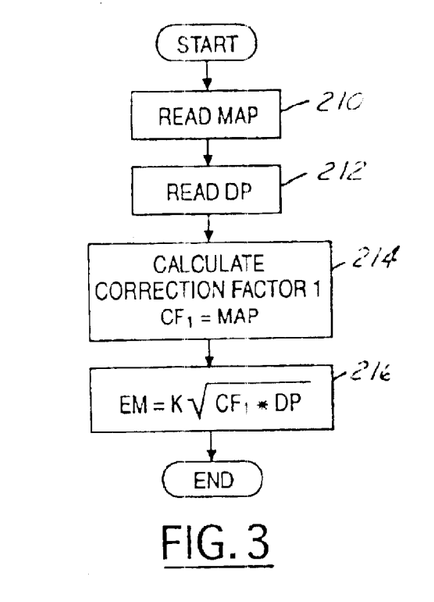
FIGS. 3–6 are a high level flowcharts of various routines for controlling EGR flow.

Referring now to FIG. 3, a routine for calculating EGR flow (EM) is described. In step 210, the signal MAP is read by controller 12 from sensor 206, giving a measure of pressure downstream of orifice 205. Then, in step 212, the differential pressure, DP, across orifice 205 is read by controller 12 from sensor 206. In step 214, a correction factor, CF1, partially accounting for the compressibility effects of the EGR flow is calculated as the absolute pressure measured by signal MAP. Alternatively, if the downstream pressure measured in step 210 was pressure relative to atmosphere, correction factor CF1 would be calculated as the sum of the pressure relative to atmosphere plus the absolute pressure due to the atmosphere. Then, in step 216, EGR flow, EM, is calculated as the square root of the product of correction factor CF1, differential pressure DP, and constant K. Constant K represents a calibration term that accounts for various unit conversions and the area of orifice 205. In this way, pressure and temperature effects due to the expansion of the EGR flow through valve 200 are sufficiently removed and measurement error is reduced.

The routine described in FIG. 3 exploits the nature of the flow due to expansion first through flow control valve 200 and then through orifice 205, where the source of flow is exhaust manifold 48 and the sink is intake manifold 44 of internal combustion engine 10. Due to the typical ranges of exhaust manifold pressure and temperature and intake manifold pressure (MAP), EGR flow may be approximated using the product of pressure difference (DP) across orifice 205 and pressure downstream (MAP) of orifice 205 without need for measuring temperature upstream of orifice 205 (downstream of flow control valve 200).

Figure 4:
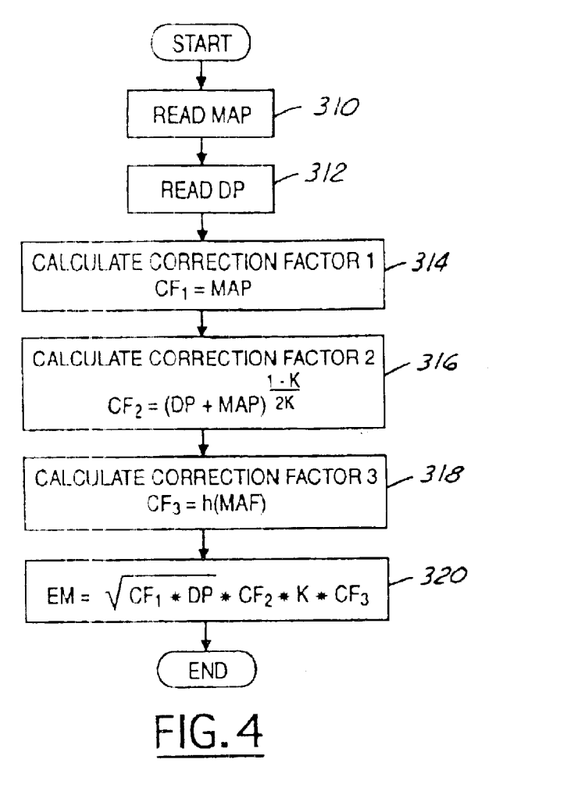

Referring now to FIG. 4, an alternate routine for calculating EGR flow (EM) is described. In step 310, the signal MAP is read by controller 12 from sensor 206, giving a measure of pressure downstream of orifice 205. Then, in step 312, the differential pressure, DP, across orifice 205 is read by controller 12 from sensor 206. In step 314, a correction factor, CF1, partially accounting for the compressibility effects of the EGR flow is calculated as the absolute pressure measured by signal MAP. Alternatively, if the downstream pressure measured in step 310 was pressure relative to atmosphere, correction factor CF1 would be calculated as the sum of the pressure relative to atmosphere plus the absolute pressure due to the atmosphere. Then, in step 316, correction factor CF2 is calculated as a function of both differential pressure DP and downstream pressure MAP, where k represents the ratio of specific heats of exhaust gas. Correction factor CF2 further accounts for the compressibility effects of the EGR flow. Then, in step 318, correction factor CF3 is calculated as a function of flow through the engine, MAF. Correction factor CF3 accounts for variations in exhaust pressure. Function h represents a function relating airflow through the engine (MAF) to exhaust pressure and is determined experimentally. Additionally, function h can include a correction for barometric pressure. In other words, the exhaust pressure is calculated as a function of both MAF and barometric pressure. The effect of barometric pressure on exhaust pressure is also determined experimentally. Barometric pressure can be either measured or estimated using methods known to those skilled in the art. Then, in step 320, EGR flow, EM, is calculated as a function of correction factors CF1, CF2, CF3, differential pressure DP and constant K. In this way, pressure and temperature effects due to the expansion of the EGR flow through valve 200 are further removed and measurement error is further reduced with additional complexity.

Figure 5:
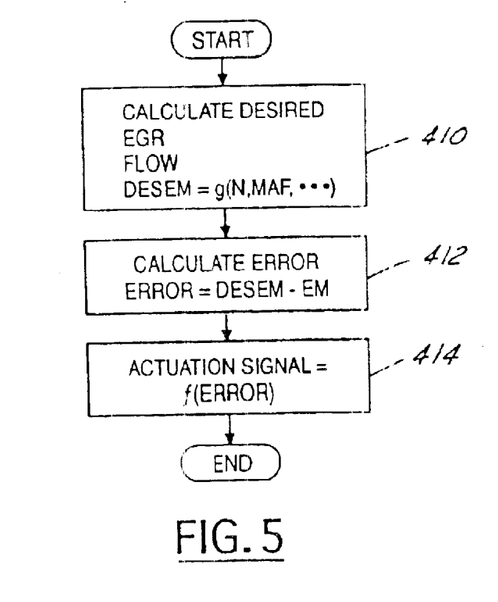

Referring now to FIG. 5, a routine for controlling EGR flow is described. In step 410, the desired EGR flow, DESEM, is calculated as a function of engine operating conditions that include engine speed (determined from signal PIP) and airflow (MAF). Then, the value of EM calculated according to either FIG. 3 or 4 is subtracted from DESEM to create an error signal, ERROR. Then, in step 414, actuation signal 226 is calculated as a function of signal ERROR. In a preferred embodiment, function (f) represents a PID controller. Alternatively, function (f) may represent any type of feedback or feedforward controller known to those skilled in the art.

Figure 6:
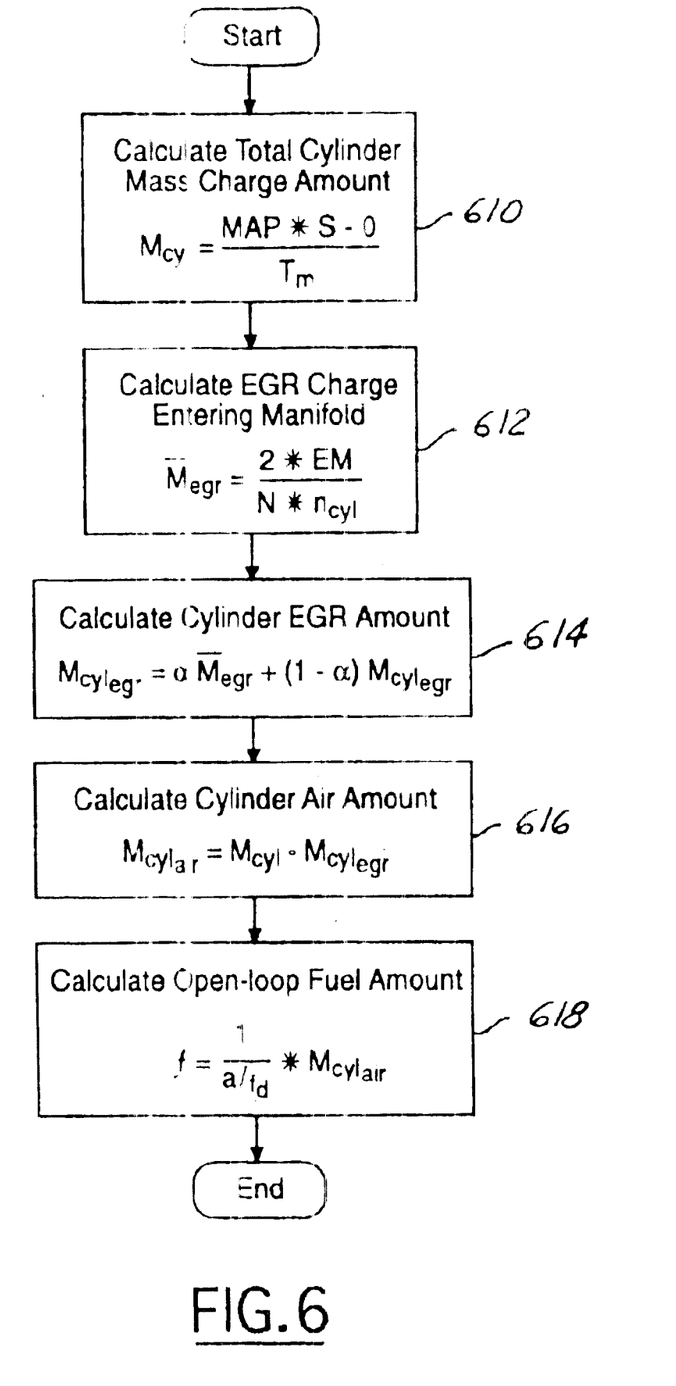

Referring now to FIG. 6, a routine for calculating cylinder air charge. The routine is executed once per engine firing. In other words, the routine is executed synchronously with engine firing events. First, in step 610, total cylinder mass charge (which is the sum of cylinder air amount and cylinder exhaust gas recirculation amount) is determined based on manifold pressure and manifold temperature. In a preferred embodiment, the following equation is used where slope (s) and offset (o) are determined as a function of engine speed.

$$m_{cyl} = \frac{MAP*s - o}{T_m}$$

Next, in step 612, EGR flow EM divided by engine speed (N) and number of cylinders ($n_{cyl}$) is determined.

$$\overline{m}_{egr} = \frac{2*EM}{N*n_{cyl}}$$

Then, in step 614, cylinder exhaust gas recirculation amount is determined by filtering $\overline{m}_{egr}$. In particular, according to the present invention, the value is filtered synchronously with engine firing events. The filter coefficient (a) is a function of engine speed. The following equation shows the filtering method.

$$m_{cyl_{egr}} = \alpha \overline{m}_{egr} + (1-\alpha) m_{cyl_{egr}}$$

Using the embodiment of FIG. 3, this can be rewritten as:

$$m_{cyl_{egr}} = \alpha \frac{2K\sqrt{MAP*DP}}{n_{cyl}N} + (1-\alpha) m_{cyl_{egr}}$$

Next, in step 616, cylinder air amount is determined by subtracting the cylinder exhaust gas recirculation amount from the total cylinder amount as shown below.

$$m_{cyl_{air}} = m_{cyl} - m_{cyl_{egr}}$$

Then, this value is used to calculate (open-loop) fuel injection amount (f) based on desired air-fuel ratio ($a/f_d$). Also, fuel injection amount (f) can be adjusted based on a measured exhaust gas oxygen concentration from a HEGO sensor using methods known to those skilled in the art to provide closed loop air-fuel ratio control.

$$f = \frac{1}{a/f_d} m_{cyl_{air}}$$

Thus, according to the present invention, it is possible to use the improved EGR flow estimation provided by having a downstream orifice and an upstream valve wherein differential pressure across the downstream orifice and manifold pressure provide the EGR flow estimate. Further, this improved EGR flow estimate is then filtered to account for manifold dynamics and used to calculate an improved cylinder air amount. Then, this improved cylinder air amount is used in air-fuel ratio control.

Figure 7:
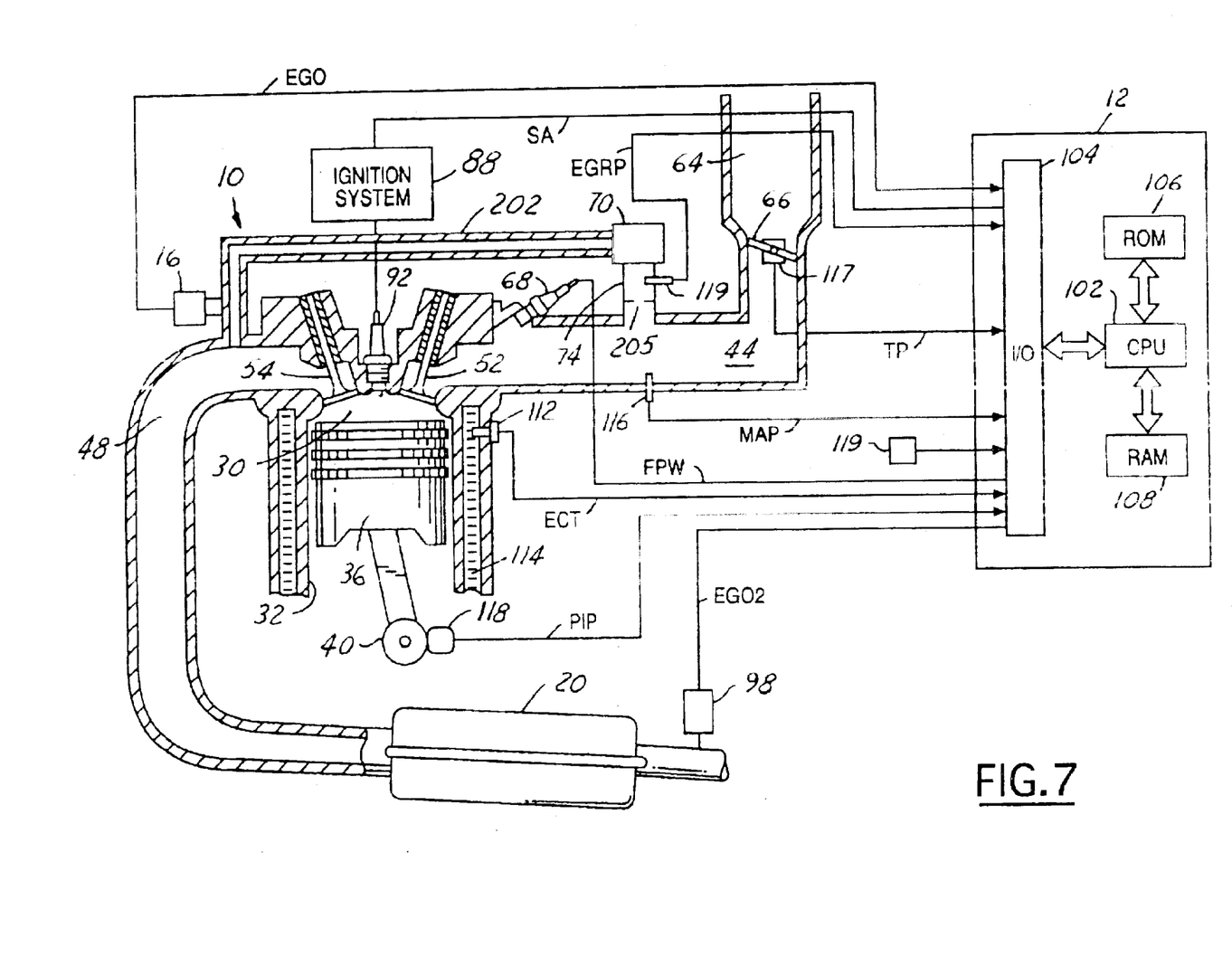
FIG. 7 is a block diagram of an engine in which the invention is used.

In another embodiment, internal combustion engine 10 comprising a plurality of cylinders, one cylinder of which is shown in FIG. 7, is controlled by electronic engine controller 12. Exhaust manifold 48 is shown coupled to exhaust gas recirculation valve 70 via exhaust gas recirculation tube 202. Exhaust gas recirculation valve 70 is also coupled to intake manifold 44 via orifice tube 74. Orifice tube 74 has orifice 205 for restricting flow therein. Alternatively, the engine may be configured such that the fuel is injected directly into the cylinder of the engine, which is known to those skilled in the art as a direct injection engine. Two-state exhaust gas oxygen sensor 98 is shown coupled to exhaust manifold 48 downstream of catalytic converter 20. Sensor 16 provides signal EGO to controller 12 which converts signal EGO into two-state signal EGO1S. A high voltage state of signal EGO1S indicates exhaust gases are rich of a reference air/fuel ratio and a low voltage state of converted signal EGO1 indicates exhaust gases are lean of the reference air/fuel ratio. Sensor 98 provides signal EGO2 to controller 12 which converts signal EGO2 into two-state signal EGO2S. A high voltage state of signal EGO2S indicates exhaust gases are rich of a reference air/fuel ratio and a low voltage state of converted signal EGO2S indicates exhaust gases are lean of the reference air/fuel ratio.

Controller 12 is shown receiving various signals from sensors coupled to engine 10, in addition to those signals previously discussed, including: a measurement of manifold pressure (MAP) from manifold pressure sensor 116 coupled to intake manifold 44; and a measurement of exhaust gas recirculation pressure (EGRP) from exhaust pressure sensor 119 coupled to orifice tube 74 upstream of orifice 205. In a preferred aspect of the present invention, engine speed sensor 119 produces a predetermined number of equally spaced pulses every revolution of the crankshaft.

Figure 8:
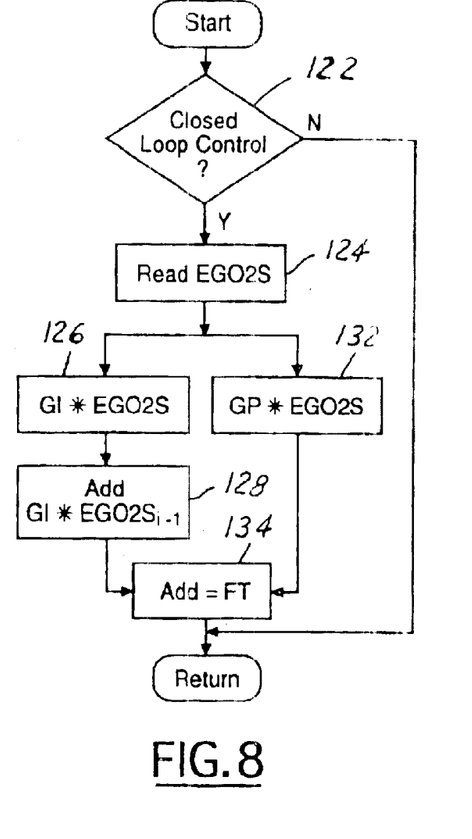
FIGS. 8–10 are high level flowcharts of various operations performed by a portion of the embodiment shown in FIG. 8.

Referring now to FIG. 8, a flowchart of a routine performed by controller 12 to generate fuel trim signal FT is now described. A determination is first made whether closed-loop air/fuel control is to be commenced (step 122) by monitoring engine operation conditions such as temperature. When closed-loop control commences, signal EGO2S is read from sensor 98 (step 124) and subsequently processed in a proportional plus integral controller as described below.

Referring first to step 126, signal EGO2S is multiplied by gain constant GI and the resulting product added to products previously accumulated (GI*EGO2S$_{i-1}$) in step 128. Stated another way, signal EGO2S is integrated each sample period (i) in steps determined by gain constant GI. During step 132, signal EGO2S is also multiplied by proportional gain GP. The integral value from step 128 is added to the proportional value from step 132 during addition step 134 to generate fuel trim signal FT.

Figure 9:
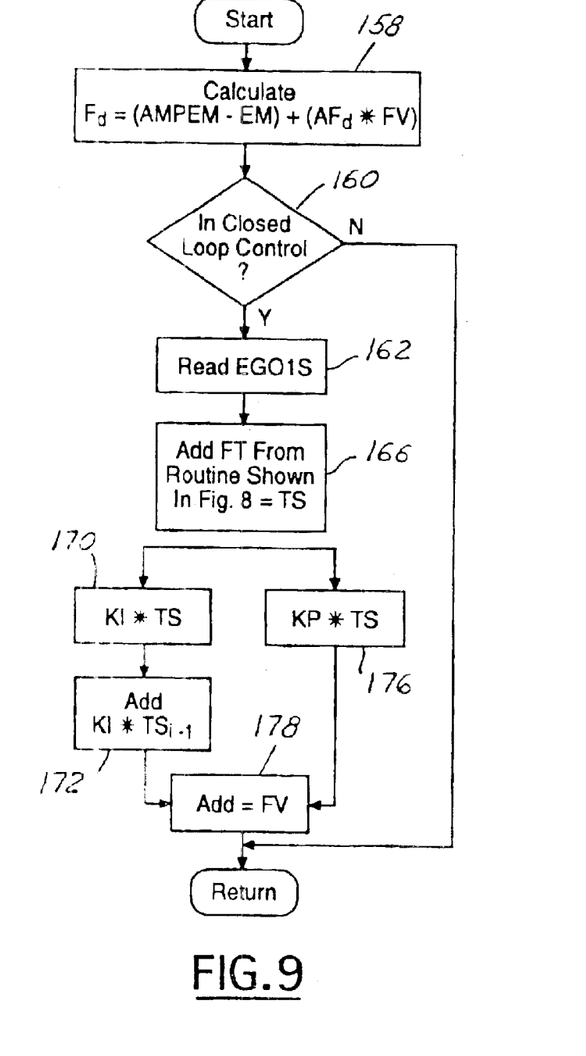

The routine executed by controller 12 to generate the desired quantity of liquid fuel delivered to engine 10 and trimming this desired fuel quantity by a feedback variable related both to sensor 98 and fuel trim signal FT is now described with reference to FIG. 9. During step 158, an open-loop fuel quantity is first determined by dividing the difference between inducted mass air flow (AMPEM, created from the signal FMAP and RPM as described later herein with particular reference to FIG. 10), which includes both fresh charge and exhaust gas recirculation, and exhaust gas recirculation estimate (EM), which is described later herein with particular reference to FIG. 10, by desired air/fuel ratio AFd which is typically the stoichiometric value for gasoline combustion. However, setting AFd to a rich value will result in operating the engine in a rich state. Similarly, setting AFd to a lean value will result in operating the engine in a lean state. Also, signal AMPEM is constructed from FMAP and RPM in the common speed density method known to those skilled in the art and can be easily empirically determined. This open-loop fuel quantity is then adjusted, in this example divided, by feedback variable FV.

After determination that closed-loop control is desired (step 160) by monitoring engine operating conditions such as temperature (ECT), signal EGO1S is read during step 162. During step 166, fuel trim signal FT is transferred from the routine previously described with reference to FIG. 8 and added to signal EGO1S to generate trim signal TS.

During steps 170, 172, 176, and 178, a proportional plus integral feedback routine is executed with trimmed signal TS as the input. Trim signal TS is first multiplied by integral gain value KI (step 170), and the resulting product added to the previously accumulated products (step 172). That is, trim signal TS is integrated in steps determined by gain constant KI each sample period (i) during step 172. A product of proportional gain KP times trimmed signal TS (step 176) is then added to the integration of KI*TS during step 178 to generate feedback variable FV.

Figure 10:
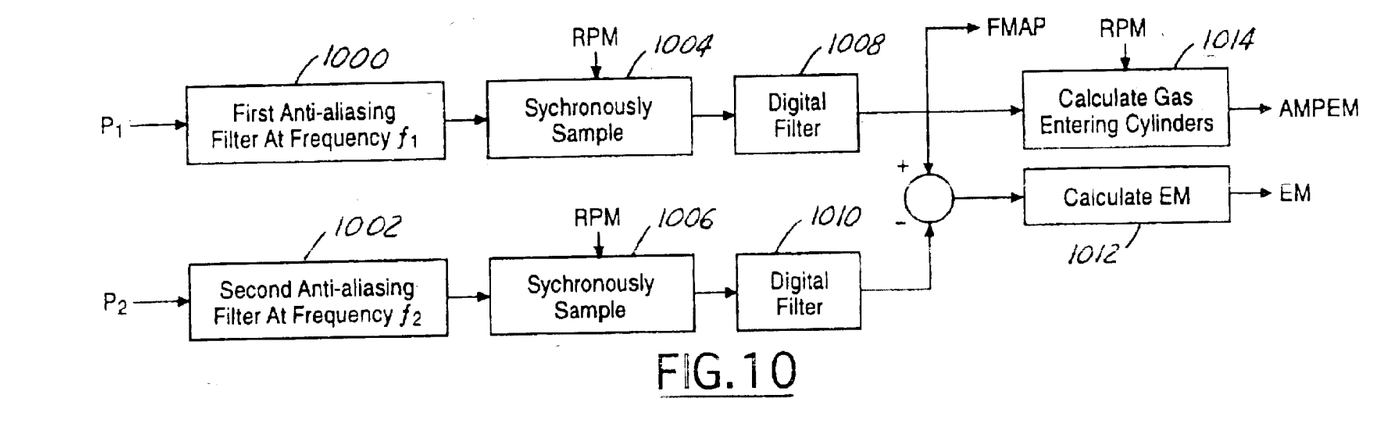

Calculating exhaust gas recirculation estimate (EM) is now described with particular reference to the diagram shown in FIG. 10. In particular, FIG. 10 shows how the upstream pressure (p1), which is signal EGRP in this example, and downstream pressure (p2), signal MAP in this example, are processed to form the signal EM. First, in block 1000, upstream pressure p1 is processed through a first filter known to those skilled in the art as an anti-aliasing filter with a cut-off frequency equal to f1. Similarly, in block 1002, downstream pressure p2 is processed through a second anti-aliasing filter with a cut-off frequency equal to f2. In some applications, it is unnecessary to use either the first or the second anti-aliasing filter because the geometry of the exhaust gas recirculation creates a mechanical filter that removes the unwanted high frequencies. Further frequencies f1 and f2 are set considerably higher than the necessary control bandwidth.

Next, in block 1004, the result of block 1000 is synchronously sampled with an engine rotation signal, such as, for example, RPM, such that the sampling is at a rate proportional to the firing frequency of the engine. For example the sampling rate could be twice the firing frequency of the engine. The proportion is generally chosen such that the sampling is at a rate of twice the highest harmonic frequency that contains significant energy. Also, as would be obvious to one of ordinary skill in the art and suggested by this disclosure, any multiple of firing frequency greater than that determined above could be used. If, for example, the exhaust gas recirculation and engine geometry are such that higher order harmonics are present in the upstream pressure signal p1, such as, for example, harmonics of twice or four times the firing frequency, a sampling rate of four or eight times the firing frequency may be necessary. Similarly, in block 1006, the result of block 1002 is synchronously sampled with engine speed signal RPM, such that the sampling is at a rate proportional to the firing frequency of the engine. Additionally, it is not necessary that the sampling rate be equal in blocks 1004 and 1006. For example, block 1004 could synchronously sample at twice the firing frequency of the engine and block 1006 could sample at eight times the firing frequency of the engine.

Alternatively, as is obvious to one of ordinary skill in the art and suggested by this disclosure, the pressure signal could be sampled at a frequency substantially proportional to the dominant frequency contained in the signal. This dominant frequency is usually equal to firing frequency. Thus, sampling at a rate proportional this dominant frequency could be accomplished using a circuit known to those skilled in the art as a phase-locked loop. However, because the phase locked loop shcme is sometimes searching for the dominant frequency during transients, this process may be suspended based on a change of position in throttle plate 62. During the transition, an open loop estimate of how the change in throttle plate 62 affects exhaust gas recirculation and manifold pressure must be obtained. This can be done using a predetermined map obtained through testing or analytical procedures and is known to those skilled in the art, where the transient behavior is estimated based on change of position in throttle plate 62 and other operating conditions, such as for example engine speed.

Next, digital filters in blocks 1008 and 1010 process the results of blocks 1004 and 1006. The digital filters, represented by G(z) or G'(z) used in blocks 1008 and 1010 are known to those skilled in the art as digital notch filters. In this application, each notch filter removes the firing frequency (and higher harmonics if necessary) of the engine. The equation below represents an example of a notch filter in the discreet domain for sampling at a rate of twice the firing frequency Use of a notch filter G(z) is also described later herein with particular reference to FIG. 5.

$$G(z)=(1+z^{-1})/2$$

If the sampling were done at a rate of eight times the firing frequency, then the following notch filter would be used as described by G'(z). Again, while this removes unwanted frequencies, transient performance is not hindered. Use of a notch filter such as G'(z) is described later herein with particular reference to FIGS. 6 and 7.

$$G'(z)=(1+z^{-1}+z^{-2}+z^{-3}+z^{-4}+z^{-5}+z^{-6}+z^{-7})/8$$

The digital filter may be different between blocks 1008 and 1010 and different than that shown above if necessary, such as if, for example, the geometry of the exhaust gas recirculation system was such that the certain frequencies were excessively amplified due to resonances. Also, the filter may be different between blocks 1008 and 1010 if block 1004 synchronously sampled at twice the firing frequency of the engine and block 1006 sampled at eight times the firing frequency of the engine.

The pressure difference is then created by subtracting the output of block 1010, which is filtered manifold pressure FMAP, from the output from block 1008. This pressure difference is then used in block 1012 to create signal EM through a predetermined map or equation between pressure difference and exhaust gas recirculation flow, and, if necessary, engine operating conditions. For example, exhaust gas temperature may be used to adjust the calculation of exhaust gas recirculation flow.

Also, in block 1014, signals FMAP and RPM are used to calculate the mass of gas flow entering the cylinder (AMPEM). The common speed density equations known to those skilled in the art are used to convert the filtered manifold absolute pressure with the engine speed to the total mass of gas (exhaust gas and fresh air charge) entering the cylinder. If necessary, these basic equations can be modified by engine operating conditions, such as for example gas temperature, or any other condition known to those skilled in the art and suggested by this disclosure.

Thus, an estimate of the exhaust gas recirculation and fresh air entering the cylinder is obtained that is substantially free of unwanted frequencies yet retains a bandwidth that is much greater than would be obtained with conventional filtering methods. Thus, the estimate can more accurately track transient operation and yield more accurate air/fuel ratio control.

Figure 11:
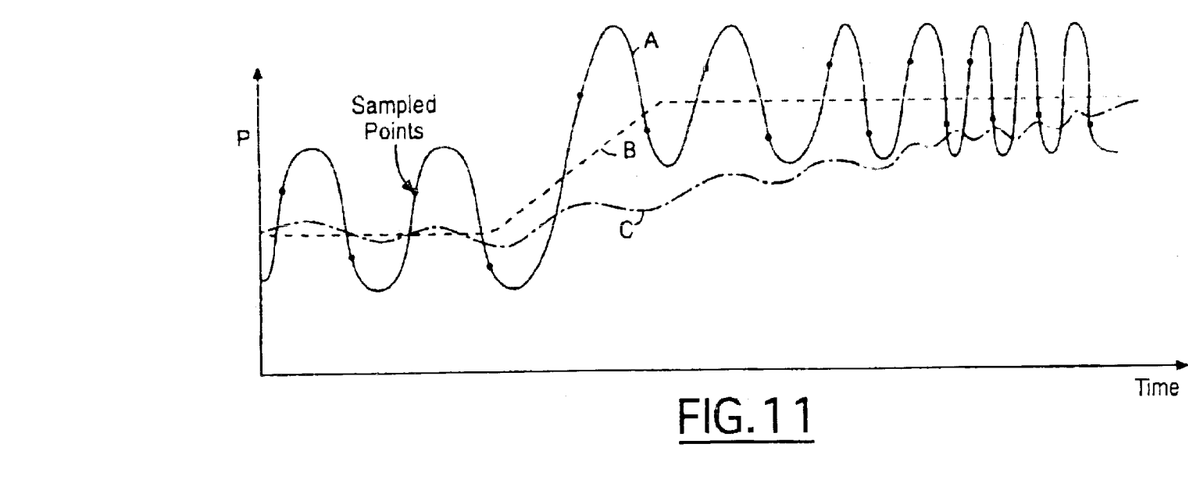
FIGS. 11–12 are examples of a fluctuating waveform on which the invention is used to advantage.

An example of synchronously sampling a waveform is now described with particular reference to the plot shown in FIG. 11. A fluctuating pressure signal, shown by the solid line and labeled A, is sampled with a frequency equal to twice the frequency of the actual signal. The sampled values are shown by points. The reconstructed waveform based on the synchronously sampled values and the filter previously described herein with particular reference to the function G(z) is shown as the dotted line and labeled B. For comparison, a signal using a conventional low pass filter, which is required for conventional sampling schemes, is shown by a dash dot line and labeled C. In this example, the exhaust gas recirculation estimate formed using the synchronous sampling will yield a more accurate value that will allow for better overall air/fuel ratio control.

Figure 12:
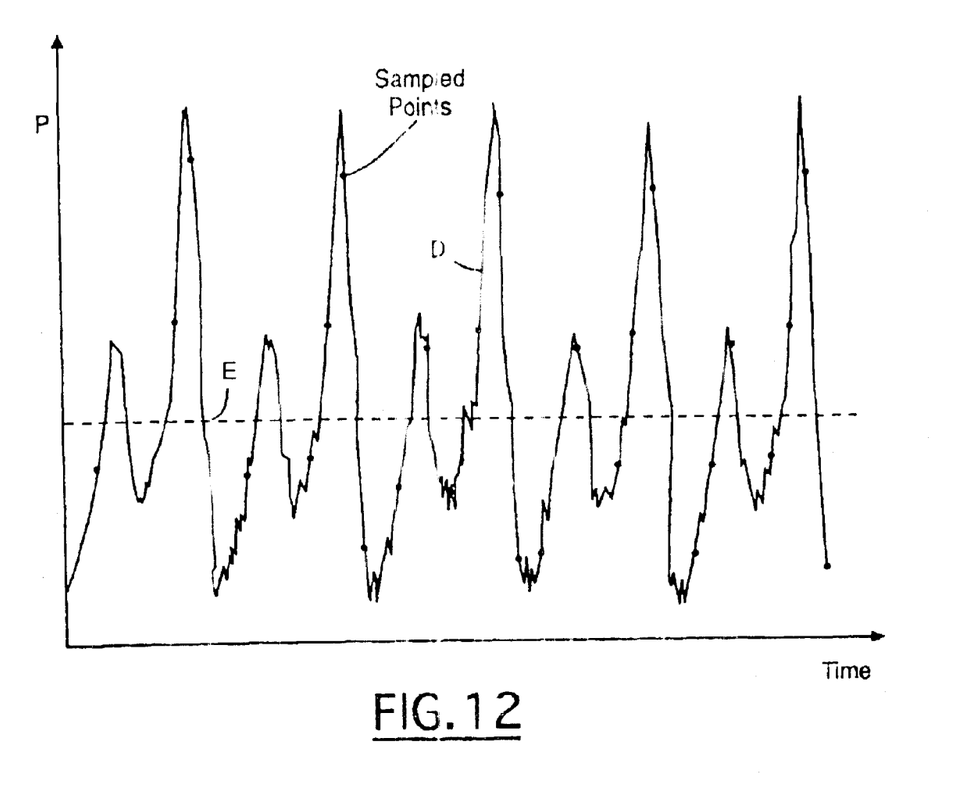

Another example of synchronously sampling a waveform is now described with particular reference to the plot shown in FIG. 12. A fluctuating pressure, shown by the solid line and labeled D, is sampled with a frequency equal to eight times the frequency of the lowest harmonic order. This signal represents a typical exhaust pressure during steady state operating conditions. The sampled values are shown by points. The reconstructed waveform based on the synchronously sampled values and the filter previously described herein with particular reference to the function G'(z) is shown as the dotted line and labeled E. This result could not be obtained unless the sampled values are all perfectly spaced with the rotation of the engine, the synchronous sampling frequency was such that it was twice the highest significant harmonic frequency of the pressure signal, and the appropriate notch filter was used. In this example, the air flow entering the cylinder estimate formed using the synchronous sampling will yield an accurate value that will allow for optimal air/fuel ratio control.

Figures 13A, 13B:
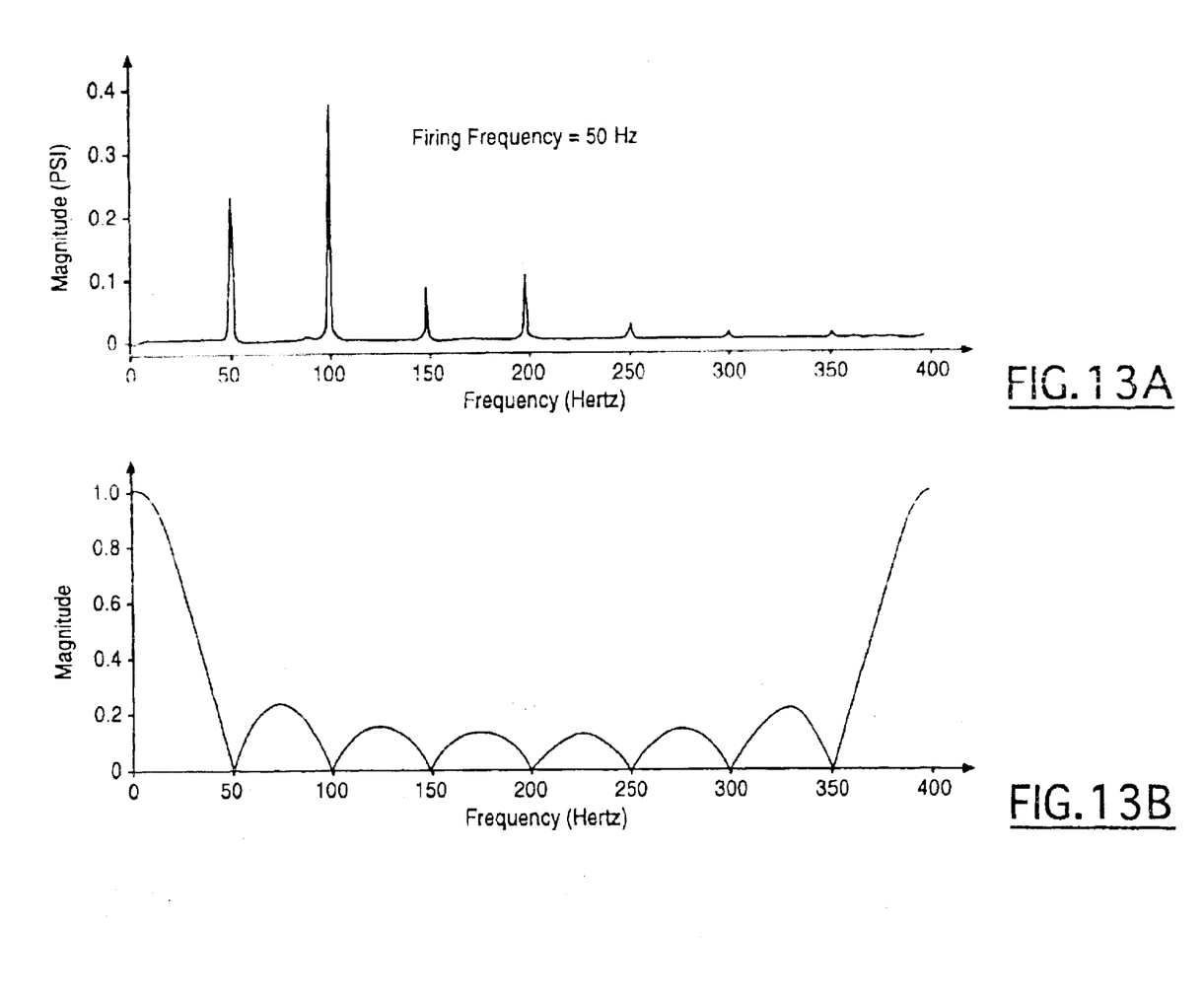
FIGS. 13A and 13B are plots showing frequency content of a pressure signal and an example of a notch filter's magnitude frequency characteristics.

Now referring to FIGS. 13A–13B and in particular to FIG. 13A, the plot shows the frequency content of the pressure waveform shown in FIG. 12. This pressure could represent, for example, the exhaust manifold pressure for a steady state firing frequency of the engine of approximately 50 Hz. FIG. 13B shows a plot of the magnitude versus frequency of the filter G'(z). Thus, the scheme previously described herein with particular reference to FIG. 10, comprises (in the frequency domain) multiplying the plots of FIGS. 13A and 13B. This shows that the mean value, or DC component as known to those skilled in the art, is preserved. The result is a signal substantially free of undesirable frequencies for mean value model computations. There are also other alternative embodiments of the present invention. For example, using a synchronous sampling scheme is not dependent on the orifice being located downstream of the exhaust gas recirculation flow control valve. The scheme could be employed using a pressure sensor upstream and a pressure sensor downstream of the orifice, with the exhaust gas recirculation flow control valve still between the downstream pressure sensor and the intake manifold, as in current production vehicles. Furthermore, the method is not restricted to flow measurement with an orifice. Other flow measurement techniques known to those skilled in the art could be used with the above described method such as, for example, a venture, a pitot tube, or a laminar flow element.

This concludes the description of the Preferred Embodiment. The reading of it by those skilled in the art would bring to mind many alterations and modifications without departing from the spirit and scope of the invention. For example, rather than a differential pressure sensor and an absolute downstream pressure sensor, two absolute pressure sensors (one upstream of the fixed area orifice ($p_1$) and one downstream of the fixed area orifice ($p_2$)) could be used as shown above. From the two absolute pressure sensors, a differential pressure signal and a downstream pressure signal could be produced. In other words, manifold pressure could be provided from the downstream pressure sensor and the differential pressure could be provided from the difference between the upstream and downstream pressure sensors. The difference could be calculated internally in the microprocessor or in an analog circuit coupled to the two pressure sensors. In other words, the equation of step 216 would become:

$$EM=K\sqrt{(p_1-p_2)*p_2}$$

Accordingly, it is intended that the scope of the invention be defined by the following claims.

We claim:

1. A system for estimating engine flows, including exhaust gas flow from an exhaust manifold of an internal combustion engine to an intake manifold of the engine and airflow into an engine cylinder, the system comprising:
 a flow control valve having a variable orifice positioned in an exhaust gas recirculation path between the exhaust manifold and intake manifold of the engine;
 a fixed orifice area located in said path and downstream of said valve; and
 a computer for determining a first signal related to pressure between said fixed orifice area and said flow control valve, determining a second signal related to pressure downstream of said fixed orifice area, calculating a third signal related to the exhaust gas flow based on said first signal and said second signal, and determining a fourth signal related to the airflow based on said second signal and said third signal.

2. The system recited in claim 1, wherein said computer further calculates a fuel injection amount based on said fourth signal.

3. The system recited in claim 2, further comprising an absolute pressure sensor for providing said second signal.

4. The system recited in claim 3, wherein said computer further calculates the exhaust flow based on a fifth signal related to a product of pressure downstream of said fixed orifice area and a difference between pressure downstream of said fixed orifice area and pressure between said fixed orifice area and said flow control valve.

5. The system recited in claim 1, wherein said valve is a pneumatically actuated valve.

6. The system recited in claim 1, wherein said valve is a stepper motor powered valve.

7. The system recited in claim 1, further comprising a differential pressure sensor for providing said first signal.

8. The system recited in claim 1, further comprising an absolute pressure sensor for providing said first signal.

9. A system for estimating engine flows, including exhaust gas flow from an exhaust manifold of an internal combustion engine to an intake manifold of the engine and airflow into an engine cylinder, the system comprising:
 a flow control valve having a variable area orifice positioned in an exhaust gas recirculation path between the exhaust manifold and intake manifold of the engine;
 a fixed orifice area located in said path and downstream of said valve;
 a first pressure sensor coupled to said path between said variable area orifice and said fixed orifice area;
 a second pressure sensor coupled to said path downstream of said fixed orifice area; and
 a computer for reading said first pressure sensor and said second pressure sensor, calculating the exhaust gas flow based on said first pressure and said second pressure, and determining the cylinder airflow based on said second pressure and said calculated exhaust gas flow.

10. The system recited in claim 9, wherein said first pressure sensor is a differential pressure sensor.

11. The system recited in claim 10, wherein said computer further filters the exhaust gas flow before determining the cylinder airflow.

12. The system recited in claim 9, wherein said first pressure sensor is an absolute pressure sensor.

13. The system recited in claim 12, wherein said computer further calculates said exhaust gas flow based on a difference between said first and second pressure and based on said second pressure.

14. The system recited in claim 13, wherein said computer further calculates said exhaust gas flow based on a product of said difference and said second pressure.

15. The system recited in claim 9, wherein said second pressure is an absolute pressure sensor.

16. A system for estimating engine flows, including exhaust gas glow from an engine exhaust to an engine intake wherein the flow passes through a flow control valve and then a fixed area measuring orifice and airflow into an engine cylinder, the system comprising:
 a flow control valve having a variable orifice positioned in an exhaust gas recirculation path between the exhaust manifold and intake manifold of the engine;
 a fixed orifice area located in said path and downstream of said valve; and
 a computer for determining a first signal related to pressure downstream of said fixed orifice area, determining a second signal related to differential pressure across said fixed orifice area, calculating a third signal related to the exhaust gas flow based on said first signal an said second signal, and determining a fourth signal related to the cylinder airflow based on said first signal an said third signal.

17. The system recited in claim 16, wherein said computer further calculates a fuel injection amount based on said fourth signal.

18. The system recited in claim 17, further comprising a differential pressure sensor for providing said second signal.

19. The system recited in claim 18, further comprising an absolute pressure sensor for providing said first signal.

20. The system recited in claim 19, wherein said computer further calculates said third signal based on a product of said first signal and said second signal.

21. The system recited in claim 20, wherein said computer further calculates said third signal based on a square root of said product of said first signal and said second signal.

22. A system for estimating engine flows, including exhaust gas flow from an exhaust manifold of an internal combustion engine to an intake manifold of the engine, the system comprising:
 a flow control valve having a variable orifice positioned in an exhaust gas recirculation path between the exhaust manifold and intake manifold of the engine;
 a fixed orifice area located in said path and downstream of said valve; and
 a computer for determining a first signal related to pressure between said fixed orifice area and said flow control valve, determining a second signal related to pressure downstream of said fixed orifice area, and determining the exhaust gas flow based on said first signal and said second signal.

23. The system recited in claim 22, wherein said computer further determines said exhaust gas flow based on a difference between said first signal and said second signal.

24. The system recited in claim 23, wherein said computer further calculates said exhaust gas flow based on a product of said difference and said second signal.

25. The system recited in claim 22, wherein said first signal is pressure between said fixed orifice area and said flow control valve.

26. The system recited in claim 22, wherein said second signal is pressure downstream of said fixed orifice area.

27. The system recited in claim 22, wherein said first signal is a pressure difference across said fixed orifice area.

28. A system for estimating engine flows, including exhaust gas flow from an exhaust manifold of an internal combustion engine to an intake manifold of the engine and airflow into an engine cylinder, the system comprising:

a flow control valve having a variable orifice positioned in an exhaust gas recirculation path between the exhaust manifold and intake manifold of the engine;

a fixed orifice area located in said path and downstream of said valve; and a computer for determining a first signal related to pressure between said fixed orifice area and said flow control valve, determining a second signal relate to pressure downstream of said fixed orifice area, determining a third signal related to the exhaust gas flow based on said first signal, and determining a fourth signal related to the cylinder airflow based on said second signal and said third signal.

29. The system recited in claim 28, wherein said third signal is further calculated based on said second signal.

30. The system recited in claim 28, wherein said first signal is based on a differential pressure sensor coupled across said fixed orifice area.

31. The system recited in claim 28, wherein said first signal is based on an absolute pressure sensor coupled between said fixed orifice area and said flow control valve.

32. The system recited in claim 28, wherein said valve is a pneumatically actuated valve.

33. The system recited in claim 28, wherein said valve is an electrically actuated valve.

34. The system recited in claim 28, wherein said valve is a stepper motor powered valve.

* * * * *